(12) United States Patent
Graves et al.

(10) Patent No.: US 6,718,804 B1
(45) Date of Patent: Apr. 13, 2004

(54) VALVE LOCKOUT DEVICE

(75) Inventors: Jay L. Graves, Plainfield, VT (US); Jay P. Tilley, Groton, MA (US)

(73) Assignee: Innovative Fluid Technology, LLC, Essex Junction, VT (US)

(*) Notice: Subject to any disclaimer, the term of this patent is extended or adjusted under 35 U.S.C. 154(b) by 72 days.

(21) Appl. No.: 09/853,275

(22) Filed: May 11, 2001

Related U.S. Application Data
(60) Provisional application No. 60/204,061, filed on May 12, 2000.

(51) Int. Cl.$^7$ ............................................. F16K 35/00
(52) U.S. Cl. ............................. 70/177; 70/178; 137/553
(58) Field of Search .................... 70/176–180; 137/553, 137/556, 385; 251/230, 95

(56) References Cited

U.S. PATENT DOCUMENTS

| | | | | | |
|---|---|---|---|---|---|
| 812,021 | A | * | 2/1906 | Dahl | 70/178 X |
| 1,003,211 | A | * | 9/1911 | Shepard | 70/178 |
| 1,131,821 | A | * | 3/1915 | Campbell | 137/385 |
| 1,158,631 | A | * | 11/1915 | Caldwell | 70/178 X |
| 1,380,675 | A | | 6/1921 | Myers | |
| 1,506,493 | A | * | 8/1924 | Levison | 70/178 |
| 1,590,032 | A | * | 6/1926 | Jauch | 70/178 X |
| 1,668,223 | A | | 5/1928 | Utman | |
| 1,877,529 | A | | 9/1932 | Platt | |
| 1,903,581 | A | * | 4/1933 | Turner | 70/178 X |
| 1,920,128 | A | * | 7/1933 | Mickle | 70/178 |
| 2,094,773 | A | * | 10/1937 | Cohick | 70/178 |
| 2,377,036 | A | * | 5/1945 | Quarfoot | 70/178 |
| 2,623,380 | A | * | 12/1952 | Lee | 70/178 |
| 2,706,900 | A | * | 4/1955 | Johnson | 70/178 |
| 2,748,589 | A | * | 6/1956 | Hulslander | 70/180 |
| 3,156,256 | A | * | 11/1964 | Weaver | 137/385 |
| 3,980,099 | A | | 9/1976 | Youngblood | 137/382 |
| 3,981,165 | A | * | 9/1976 | Wersinger | 70/178 X |
| 4,024,740 | A | | 5/1977 | Di Giovanni | 70/175 |
| 4,062,208 | A | * | 12/1977 | Nielsen, Jr. | 70/178 |
| 4,450,697 | A | | 5/1984 | Ellis | 70/178 |
| 4,619,437 | A | * | 10/1986 | Williams et al. | 251/81 |
| 4,926,900 | A | * | 5/1990 | Pietras | 70/178 X |
| 5,058,622 | A | | 10/1991 | Chitty, Jr. et al. | 137/385 |
| 5,482,251 | A | * | 1/1996 | Roberts | 251/288 |
| 5,735,147 | A | * | 4/1998 | Cattanach et al. | 70/178 X |
| 5,806,555 | A | * | 9/1998 | Magno, Jr. | 70/178 X |
| 5,823,023 | A | * | 10/1998 | Benda | 70/180 |
| 6,070,442 | A | * | 6/2000 | Neeley et al. | 70/175 |
| 6,112,619 | A | * | 9/2000 | Campbell | 74/553 |
| 6,463,955 | B2 | * | 10/2002 | Hasak et al. | 137/553 |

* cited by examiner

*Primary Examiner*—Suzanne Dino Barrett
(74) *Attorney, Agent, or Firm*—Downs Rachlin Martin PLLC

(57) ABSTRACT

A lockout device (20, 120, 220) for locking a valve (22, 122, 222) into its closed position. In a first embodiment, a lockout device (20) is adapted for use with a valve (22) having a lever-type handle (24) and a valve body (28). Accordingly, the first embodiment includes a generally cup-shaped member (36) having an elongate close-ended slot (46) for receiving the lever-type handle. In a second embodiment, a lockout device (120) is adapted for use with a valve (122) that includes a handle (124) having raised indicia (174) on its upper surface (176). Accordingly, the second embodiment includes a generally cup-shaped member (136) that includes an end wall (140) having a recess (182) for receiving the raised indicia only when the valve is in its fully-closed position. A third embodiment of a lockout device (220) comprises a base (272) and a locking member (274) telescopically engaging the base. The locking member may alternately be positioned in a retracted, unlocked position and an extended, locked position.

16 Claims, 6 Drawing Sheets

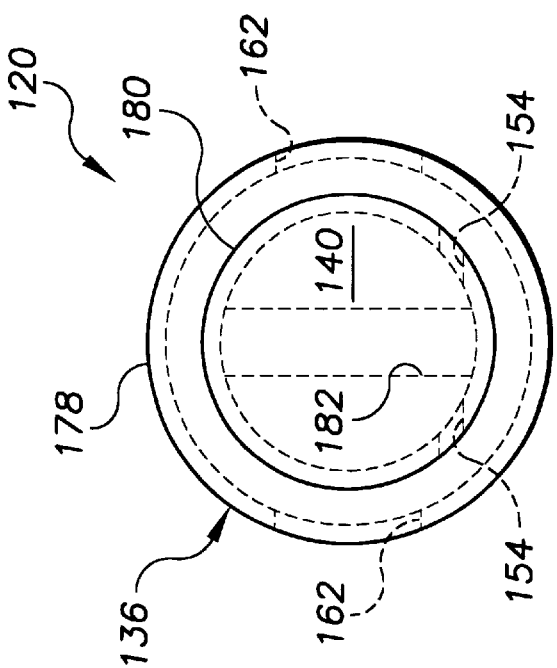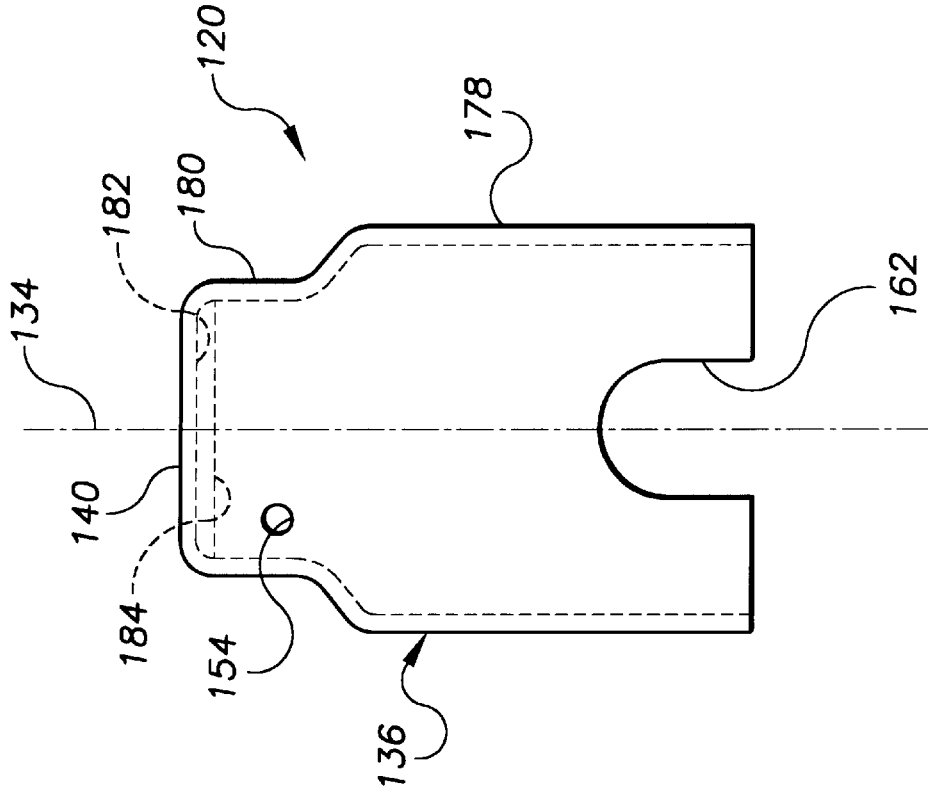

VALVE LOCKOUT DEVICE

This application claims priority on U.S. Provisional Application Ser. No. 60/204,061, filed May 12, 2000, entitled "Valve Locking Device".

FIELD OF INVENTION

The present invention relates generally to the field of safety devices. More particularly, the present invention is directed to a lockout device for preventing someone from operating a manually operated valve.

BACKGROUND OF THE INVENTION

A system for transporting fluids, such as gases or liquids, or for providing a vacuum typically incorporate various types and quantities of valves and other components to measure and control the fluid as it passes through the system to its point of utilization. Often it is necessary to isolate and shut down one or more portions of the system to perform modifications and/or routine maintenance on the system while the remaining portion of the system remains energized. Often this is accomplished by closing one or more isolation valves that isolates the shut-down, or de-energized, portion(s) of the system from the energized portion.

To protect workers from harm due to contact with, e.g., hazardous materials, high pressures, high temperatures and the like contained within still-energized portion of the system, it is often desirable to lock each isolation valve in its closed position to prevent someone from opening the valve while work is being performed on the system. In fact, government regulations, e.g., regulations promulgated by the Occupational and Safety Hazards Administration (OSHA), often require under penalty of law that valves be locked during maintenance and modification outages.

The semiconductor manufacturing and chemical manufacturing industries are two examples of many industries that utilize often vast and complex piping systems. These systems typically contain manually-operated isolation valves that must be locked into their closed positions during maintenance and modification outages. Such manually-operated valves are many and diverse, requiring different types of lockout devices to lock the corresponding valves in their closed positions.

For example, some isolation valves are known as "quarter-turn" valves, meaning that the handles of these valve are rotatable 90° between their fully-open positions and their fully-closed positions. Many of these valves have single-member lever-type handles, wherein the handle of each valve is parallel to the valve's inlet and outlet pipes when the valve is installed in a straight run of pipe. Correspondingly, the handle of the valve is positioned perpendicular to the inlet and outlet pipes when the valve is in its closed position.

A conventional lockout device for this lever-type isolation valve typically includes a tubular member that generally fits over the valve stem and body of the valve and has a longitudinal open-ended slot for receiving the valve handle as the device is installed over the valve and holding the handle in its fully closed position, i.e., perpendicular to the inlet and outlet pipes. The device generally straddles the valve and includes a pair of notches at its lower end that, when properly seated on the valve, each correspondingly engage one of the inlet and outlet pipes to prevent the device and handle from being rotated relative to the valve body. An example of such a lockout device is disclosed in U.S. Pat. No. 812,021 to Dahl. A drawback of this device is that the open-ended slot extends substantially entirely along the height of the device and is open at its lower end so that the torsional rigidity of the device along its longitudinal axis is significantly diminished. Depending upon the material selected for making the lockout device and the wall thickness of the device, the torsional rigidity may be so small that the device may be easily torsionally distorted, and the valve handle turned, by application of a relatively small force.

In addition to a lever-type handle, some valves have cross-shaped handles having raised indicia disposed along one of two mutually orthogonal axes that define the cross shape. Until the present invention, it appears there have been no lockout devices that utilize such raised indicia in a manner that the raised indicia prevent a lockout device from being properly seated on a valve unless the handle is in its fully closed position.

Another shortcoming of conventional lockout devices is that most are secured to a valve only when it is desired to lock the valve. When these lockout devices are not being used, they must be stored, typically in a location remote from the valves. At least one valve guard, as disclosed in U.S. Pat. No. 3,980,099 to Youngblood, may be permanently mounted to the piping adjacent the corresponding valve. However, when the guard is not being used, its locking member is pivoted away from the valve handle such that it projects radially outward from the piping a significant distance beyond the valve handle. The Youngblood valve guard, therefore, requires a significant amount of space to be operated. In some piping systems, such space may not be available.

The various embodiments of the lockout device of the present invention overcome these and other shortcomings of conventional lockout devices.

SUMMARY OF THE INVENTION

In a first aspect, the present invention is directed to a lockout device for a valve having a valve body and a handle. The lockout device comprises a member defining a space for receiving at least a portion of the valve body and at least a portion of the handle. The member has a longitudinal axis and a height extending along the longitudinal axis, a lower end and a first opening at the lower end. A second opening is provided in the member for receiving at least a portion of the handle. The second opening is spaced from the lower end of the member such that a portion of the member is present between the second opening and the lower end of the member.

In second aspect, the present invention is directed to a lockout device for a valve that includes a body and a handle having a surface and raised indicia located on, and extending away from, the surface. The lockout device comprises a member having a sidewall an end wall. The sidewall and the end wall define a space for receiving at least a portion of the handle and at least a portion of the body. Lockout device is provided with means for receiving the raised indicia, and not the handle, only when the handle is oriented properly with respect to the lockout device when the device is engaged with the valve. The means is located on the member.

In a third aspect, the present invention is directed to a lockout device for a valve having a valve body and a handle. The lockout device comprises a base having a longitudinal axis and adapted for engaging at least a portion of the valve body. A locking member is slidably engaged with the base and has a retracted position relative to the base, an extended position relative to the base and at least one slot for engaging the handle of the valve when the locking member is in its extended position. The locking member is slidable between the retracted position and the extended position along the longitudinal axis.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIG. 5 is a side elevational view of the lockout device shown in FIG. 4;

FIG. 6 is a plan view of the lockout device shown in FIG. 4;

DETAILED DESCRIPTION OF THE INVENTION

Figure 2:
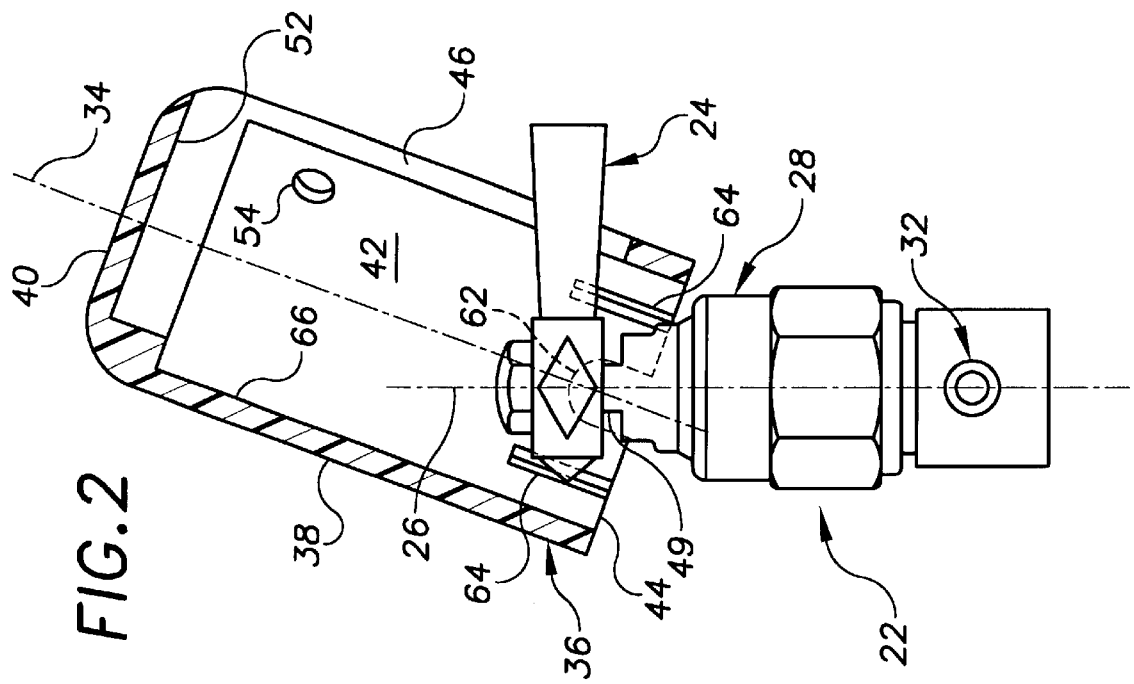
FIG. 2 is a partial cross-sectional elevational view of the lockout device of FIG. 1 shown partially engaging a valve.
Figure 1:
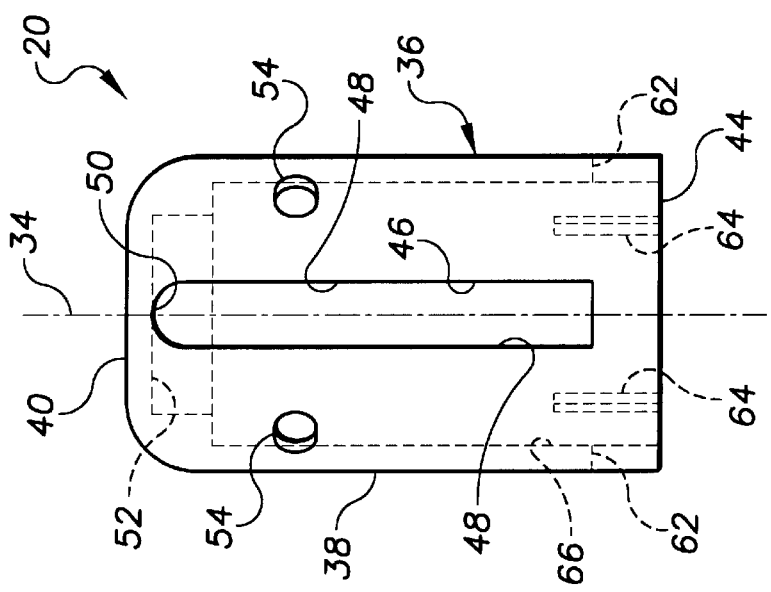
FIG. 1 is a front elevational view of a first embodiment of a lockout device according to the present invention.
Figure 4:
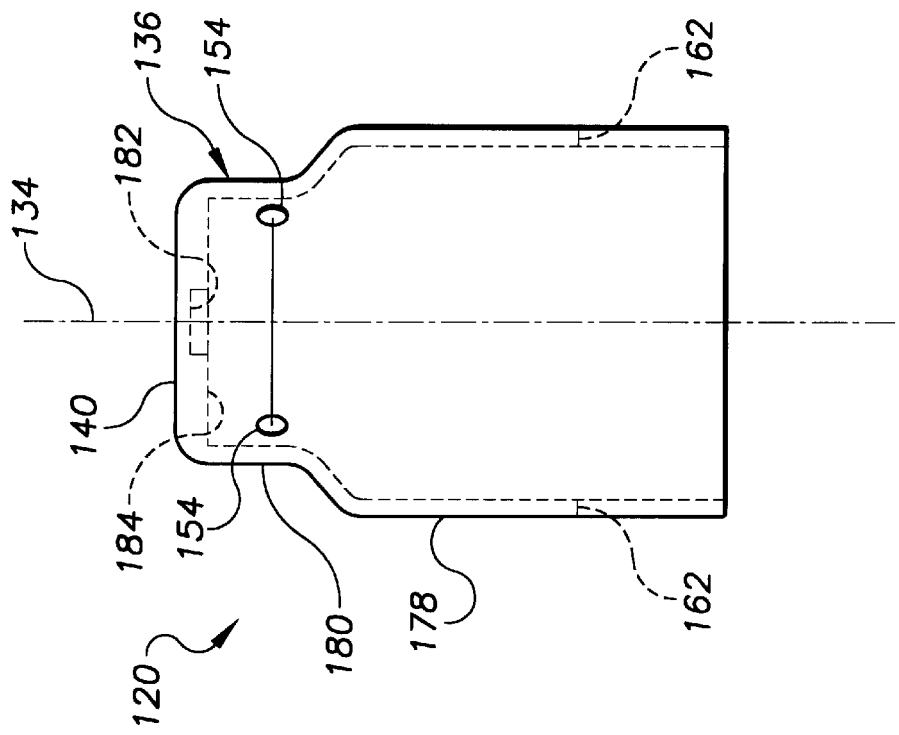
FIG. 4 is a front elevational view of a second embodiment of a lockout device according to the present invention.
Figure 3:
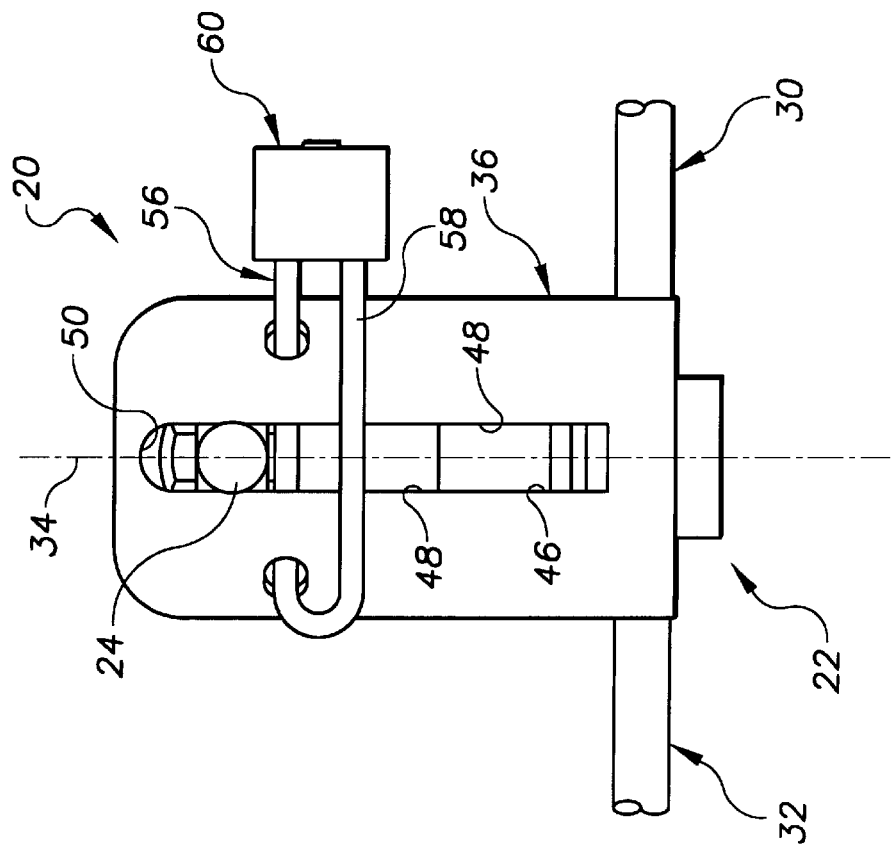
FIG. 3 is an elevational view of the lockout device of FIG. 1 shown properly seated on a valve.

Referring now to the drawings, wherein like numerals denote like elements, there is shown in FIGS. 1–3 in accordance with the present invention a lockout device, which is generally denoted by the numeral 20. Lockout device 20 allows a user to lock an isolation valve 22 having a lever-type handle 24 into its closed position, as shown in FIG. 3. Valve 22 is typically, but not necessarily, a "quarter-turn" valve, meaning that handle 24 rotates 90° about a valve-stem axis 26 with respect to valve body 28 between its fully-open position (not shown) and its fully-closed position, shown in FIGS. 2 and 3. An example of such a valve is Model No. 6LV-DLBW4, available from Nupro Company, Willoughby, Ohio. Valve 22 is shown installed in a straight-run of piping. Accordingly, a straight section of an inlet pipe 30 and a straight section of an outlet pipe 32 are attached to valve body 28 at diametrically opposing locations. One skilled in the art, however, will recognize that the present invention may be used at locations other than straight runs of piping, such as adjacent elbows, immediately adjacent equipment or other devices, or the like.

Lockout device 20 has a longitudinal axis 34 and comprises a member 36 having a sidewall 38 and an end wall 40 that together define a space 42 for receiving a portion of handle 24 and a portion of valve body 28. Sidewall 38 defines an open end 44 opposite end wall for first receiving valve 22 while lockout device 20 is installed onto the valve. Sidewall 38 is preferably tubular and may have any cross-sectional shape in a direction perpendicular to longitudinal axis 34, such as cylindrical, rectangular, oval or hexagonal, among others.

In a preferred embodiment, lockout device 20 is made of plastic, such as polycarbonate, polyvinyl chloride or polypropylene, among others, and is preferably molded as a unitary structure. Polycarbonate is presently preferred because it is a translucent plastic that allows a user to view valve 22 while lockout device 20 is in its seated position. Lockout device 20 may alternatively be made of another material, such as a metal or a resin-fiber composite, among others. However, plastic is preferred due to the relatively low manufacturing cost of using plastic. In addition, and as described below in detail, the structure of lockout device 20 is particularly suited for plastic. Moreover, lockout device 20 may be formed from two or more components attached to one another, e.g., by adhesive bonding, mechanical fasteners and/or welding, among others, to form a relatively rigid, unitary body. The physical dimensions of lockout device 20, such as inside diameter, thickness of sidewall 38 and end wall 40 and length along longitudinal axis 34, among others, can vary greatly depending upon such parameters as the particular design of valve 22, the size of the valve and the material selected for the device. However, for valve Model No. 6LV-DLBW4, mentioned above and polypropylene as the selected material for lockout device 20, the inside diameter of sidewall 38 is preferably about 1.45 inches, the length of the lockout device along longitudinal axis 34 is preferably about 3.0 inches and the thickness of the sidewall is about 0.125 inches.

Sidewall 38 includes a longitudinal, close-ended slot 46 for receiving handle 24 of valve 22 during installation of lockout device 20 onto the valve and when the lockout device is properly seated on the valve, i.e., the handle is in its fully-closed position and the lockout device is engaged with the valve in its intended operating position. Preferably, the width of slot 46 is only slightly larger than the outside diameter of handle 24 so that there is a snug fit between the handle and the longitudinal sides 48 of the slot, particularly when lockout device 20 is properly seated on valve 22. Such a snug fit significantly limits or prevents play between handle 24 and lockout device 20 that could allow someone to open valve 22, albeit only slightly.

Longitudinal sides 48 of slot 46 may be parallel to one another, as shown, or may be non-parallel, e.g., where the slot is generally triangular in shape with one of the vertices of the triangle located adjacent end wall 40 and the other two vertices located adjacent open end 44. Such a triangular shaped slot may be necessary for a valve having a handle that tapers inwardly toward its longitudinal axis from its free end toward the valve stem 49 or may be used when it is desired that longitudinal sides 48 snugly engage handle 24 only when lockout device 20 is fully seated on valve 22. In another embodiment of lockout device 20 suited for a valve having a tapered handle, slot 46 may be a keyhole slot. Slot 46 may further include a radiussed end 50 having a radius that substantially matches the radius of handle 24 at the slot so that the radiussed end snugly engages the handle when lockout device 20 is fully engaging valve 22. Member 36 may further include a recess 52 formed in end wall 40 for receiving a portion of handle 24 distal from valve body 28.

By virtue of slot 46 being close ended proximate open end 44 of member 36, the member has a much greater torsional rigidity than if the slot were open ended adjacent the open end. This increased torsional rigidity is important in that lockout device 20 is more robust than it otherwise would be and can more firmly hold handle 24 in its closed position, even when someone attempts to move the handle toward its open position while the lockout device is fully seated on valve 22. Torsional rigidity is an important parameter for lockout device 20 since any rotational force applied to handle 24 while the lockout device is fully seated on valve 22 is applied at the end of member 36 distal from the end of the member where such force is resisted, i.e., adjacent open end 44.

Lockout device 20 may include one or more apertures 54, e.g., in sidewall, for receiving a stop 56, that prevents the lockout device from being removed from valve 22. Stop 56 may further provide the function of keeping lockout device 20 engaged with valve 22 when valve stem 49 projects downward relative to a horizontal plane. Stop 56 may be, e.g., the shackle 58 of a padlock 60 or other device having an elongate member that may be inserted through apertures 54. In a preferred embodiment, apertures 54 are located such that handle 24 of valve 22 blocks stop 56 when someone attempts to remove lockout device 20 while it is properly seated on valve 22, thereby preventing removal of the lockout device from the valve. However, apertures 54 may be located elsewhere such that stop 56 engages another part of valve 22, such as the valve body 28, when someone attempts to remove lockout device 20. Apertures 54 are also preferably located such that little or no play exists between stop 56 and handle 24 when lockout device 20 is fully engaged with valve 22.

Lockout device 20 should be provided with one or more anti-rotation means for preventing, or minimizing, relative rotation between the lockout device and valve 22 when the lockout device is properly seated on the valve. For example, the anti-rotation means may include a pair of notches 62 sized to snugly engage the inlet and outlet pipes 30, 32 attached to valve body 28. Such notches 62 are particularly suited for providing the anti-rotation feature when valve body 28 has a circular cross-sectional shape in a plane perpendicular to valve stem axis 26. If valve body 28 has a rectangular cross-sectional shape (not shown) in a plane perpendicular to valve stem axis 26, the anti-rotation means may include one or more V-shaped grooves 64 on the inner surface 66 of member 36 adapted to engage one or more of the corresponding edges of the rectangular valve body. Since there are many different valve body shapes that may be used with lockout device 20, it is impractical to enumerate the many anti-rotation means that may be provided. However, one skilled in the art will appreciate the variety of such means that fall within the scope of the present invention.

An installer (not shown) may install lockout device 20 onto valve 22 as follows. First the user tilts longitudinal axis 34 of lockout device 20 with respect to valve stem axis 26 and first engages open end 44 with handle 24 and then slot 46 with the handle. This is shown generally in FIG. 2. Once handle 24 is engaged with slot 46, the installer may then tilt longitudinal axis 34 until it is coaxial with valve stem axis 26 and move member 36 relative to valve 22 such that notches 62 engage inlet and outlet pipes 30, 32. When lockout device 20 is properly seated on valve 22, the installer may then insert stop 56, which is one leg of shackle 58 of padlock 60, through apertures 54 and lock the padlock to secure the lockout device in place as shown in FIG. 3. Lockout device 20 may be removed from valve 22 by generally performing the foregoing steps in reverse.

Figure 7:
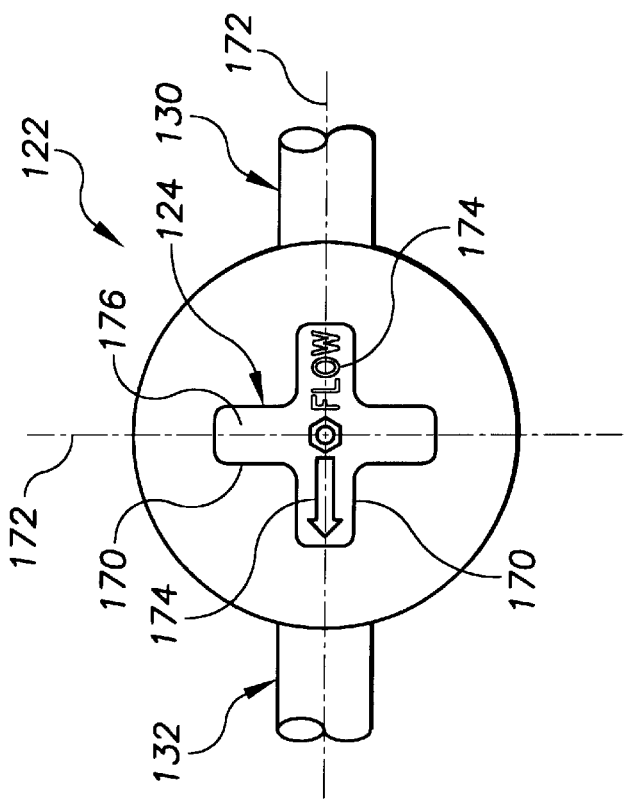
FIG. 7 is a plan view of a valve with which the lockout device of FIG. 4 may be used.

Referring now to FIGS. 4–6, 8 and 9, there is shown a second embodiment of a lockout device 120 according to the present invention designed for use with a valve 122 having a particular style of handle 124, which is shown generally in FIG. 7. An example of valve 122 is Model No. 201-36-01, available from Entegris, Inc., Chaska, Minn.

Figure 8:
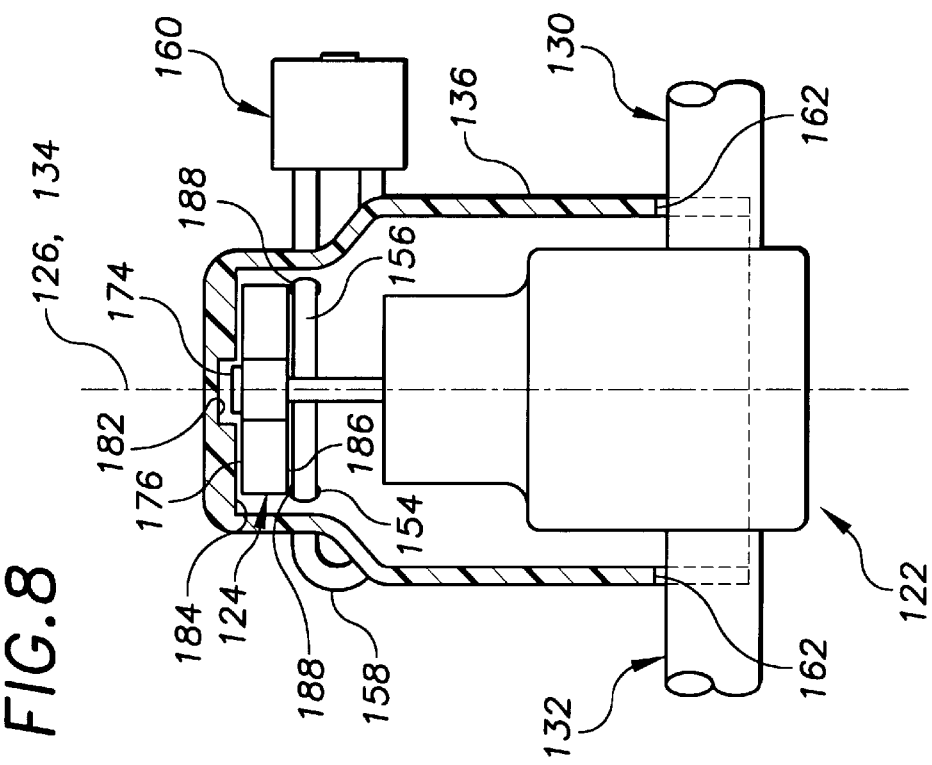
FIG. 8 is a partial cross-sectional elevational view of the lockout device of FIG. 4 shown properly seated on a valve.
Figure 9:
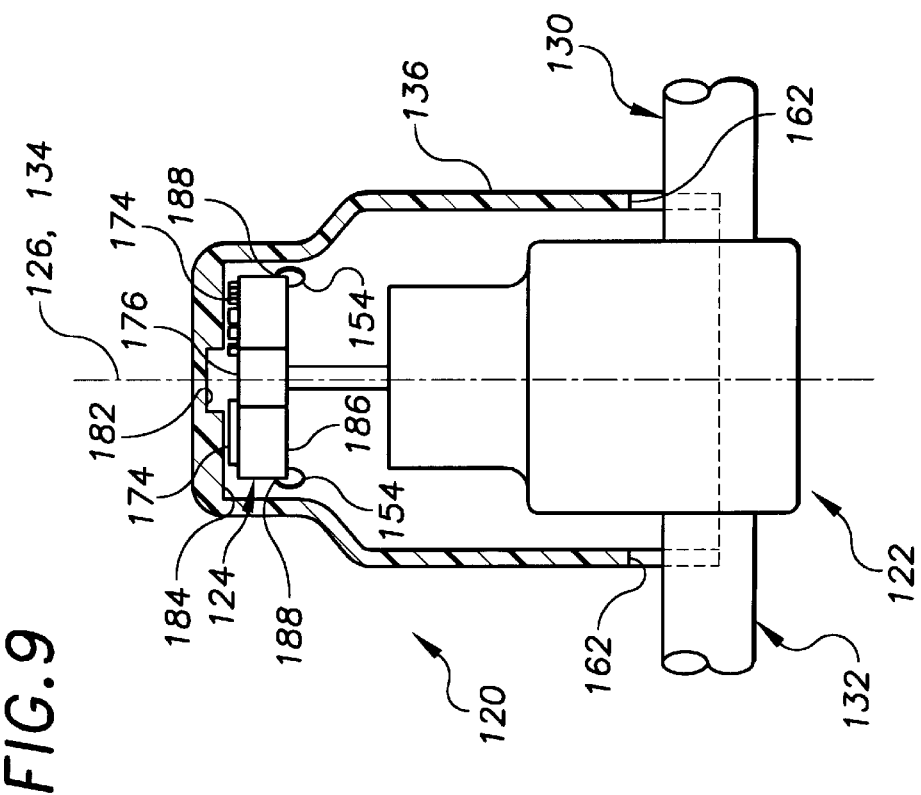
FIG. 9 is a partial cross-sectional elevational view of the lockout device of FIG. 4 shown improperly seated on a valve.

With reference to FIGS. 7–9, valve 122 includes a valve body 128, a valve stem 149 lying along a valve stem axis 126 and a cross-shaped handle 124 having four handle grips 170 projecting outwardly from the valve stem axis 126. The four handle grips 170 lie along two mutually orthogonal axes 172. In this particular style, handle 124 includes raised indicia 174 that projects away from upper surface 176 of the handle and lie along only one of mutually orthogonal axes 172. Valve 122 is typically, but not necessarily, a "quarter-turn" valve, meaning handle 124 rotates 90° between its fully open position, shown in FIGS. 7 and 9, and its fully-closed position, shown in FIG. 8. Raised indicia 174 may be any structure that projects away from upper surface 176. For example, raised indicia may contain information pertinent to the valve, such as an arrow and word "FLOW" as shown in FIG. 8 that indicate the direction of flow through valve 122 when handle 124 is in its fully-open position, or may be another structure such as a screw head or a body of material bonded, or otherwise fastened, to the handle at upper surface 176. One skilled in the art will appreciate the variety of structures that may be provided to handle 124 to provide the necessary function.

As shown in FIG. 7, when handle 124 is in its fully open position, raised indicia 174 lie along a line parallel with the longitudinal axes of inlet pipe 130 and outlet pipe 132. Valve 122 being a quarter-turn valve, when handle 124 is in its fully-closed position, raised indicia 174 is in the position shown in FIG. 8, wherein the raised indicia has been rotated 90° with respect to the fully-open position. The unique interaction between lockout device 120 and valve 122 is described in detail below.

Referring to FIGS. 4–6, 8 and 9, lockout device 120 has a longitudinal axis 134 and may comprise a generally cup-shaped member 136 having a valve body receiving portion 178 and a handle receiving portion 180 that are shaped and sized to closely follow the general contours of the outline of valve 122. Handle-receiving portion 180 includes an end wall 140 distal from valve body receiving portion 178. Member 136 is preferably made of plastic, such as polycarbonate, polyvinyl chloride or polypropylene, among others, and is preferably molded as a unitary structure. Lockout device 120 may alternatively be made of another material, such as a metal or a resin-fiber composite, among others. In addition, lockout device 120 may be formed from two or more components attached to one another, e.g., by adhesive bonding, mechanical fasteners and/or welding, among others, to form a relatively rigid, unitary body. However, plastic is preferred due to the relatively low manufacturing cost of using plastic.

The physical dimensions of lockout device 120, such as inside diameters, thickness of sidewall 138 and end wall 140 and length of member 136 along longitudinal axis, among others, can vary greatly depending upon such parameters as the particular design of valve 122, the size of the valve and the material selected for the device. However, for valve Model No. 201-36-01 mentioned above and polypropylene as the selected material for lockout device 120, the inside diameter of valve body receiving portion 178 is preferably about 3.0 inches, the inside diameter of handle receiving portion 180 is preferably about 2.0 inches, the length of member 136 is preferably about 4.6 inches and the wall thickness is about 0.125 inches.

One skilled in the art will recognize that the shape of member 136 shown is only one of many shapes that may be used. For example, instead of the generally circular cross-sectional shape shown, member 136 may have another cross-sectional shape, such as the rectangular, hexagonal and oval shapes described above with respect to lockout device 120. In addition, member need not have the contoured shape, but rather may have a uniform cross-sectional shape perpendicular to longitudinal axis 134 along the entire length of member 136.

End wall 140 of handle receiving portion 180 includes a means for receiving raised indicia 174 only when handle 124 is in its closed position. For example, such means may be a recess 182, such as the generally U-shaped channel shown. However, the means may be another structure, such as a slotted aperture (not shown). Recess 182 may be any shape required to accommodate the particular shape(s) of raised indicia 174 present on handle 124.

Member 136 preferably includes one or more apertures 154 for receiving a stop 156, that prevents lockout device 120 from being removed from valve 122. Stop 156 may be, e.g., the shackle 58 of a padlock 60 or other device having an elongate member that may be inserted through apertures 154. In a preferred embodiment, apertures 154 are located such that handle 124 blocks stop 156 when someone attempts to remove lockout device 120, thereby preventing removal of the lockout device from valve 122. However, apertures 154 may be located elsewhere such that stop 156 engages another part of valve 122, such as valve body 128, when someone attempts to remove lockout device 120. Apertures 154 are also preferably located such that little or no play exists between stop 156 and handle 124 when lockout device 120 is fully engaged with valve 122. This minimizes or eliminates the ability of someone attempting to tamper with valve 122 to move handle 124 relative to valve body 128.

Recess 182 and apertures 154 are positioned relative to one another such that stop 56 cannot be inserted through both apertures simultaneously unless handle 124 is in its fully-closed position. Thus, valve 122 cannot be locked unless handle 124 is in its fully-closed position. To achieve this unique safety feature with the embodiment shown in FIGS. 4–6, 8 and 9, inner surface 184 of end wall 140 is spaced from apertures 154 by a distance equal to, or slightly greater than, the thickness of handle 124 at a location other than at raised indicia 174. In addition, recess 182 is shaped and sized to receive at least a portion of the height of raised indicia 174 only when handle 124 is in its fully-closed position.

Thus, as shown in FIG. 8, when handle 124 is in its fully-closed position, raised indicia 174 is at least partially seated in recess 182 such that lower edge 186 of the handle is located immediately adjacent upper edges 188 of apertures 154. However, as shown in FIG. 9, when handle 124 is not in its fully-closed position, raised indicia 174 are not seated in recess 182, but rather contact inner surface 184 of end wall 140, and lower edge 186 of the handle extends below upper edges 188 of apertures 154, blocking insertion of shackle 158 of padlock 160 such that the shackle cannot extend through both apertures simultaneously. Depending upon the orientation of valve stem axis 126 relative to a horizontal plane, stop 56 may provide the additional feature of keeping lockout device 120 properly engaged with valve 122 when valve stem axis 126 projects downward relative to the horizontal plane.

Similar to lockout device 20, lockout device 120 may include one or more anti-rotation means, such as notches 162, which preferably snugly engage inlet and outlet pipes 130, 132 when the lockout device is properly seated on valve 122. Lockout device 120 may in addition, or alternatively, include other anti-rotation means, such as grooves (not shown) similar to grooves 64 shown in FIGS. 1 and 3 with respect to lockout device 20. One skilled in the art will appreciate that the type of anti-rotation means provided will depend upon a particular valve design with which lockout device 120 is intended to be used.

Figure 10:
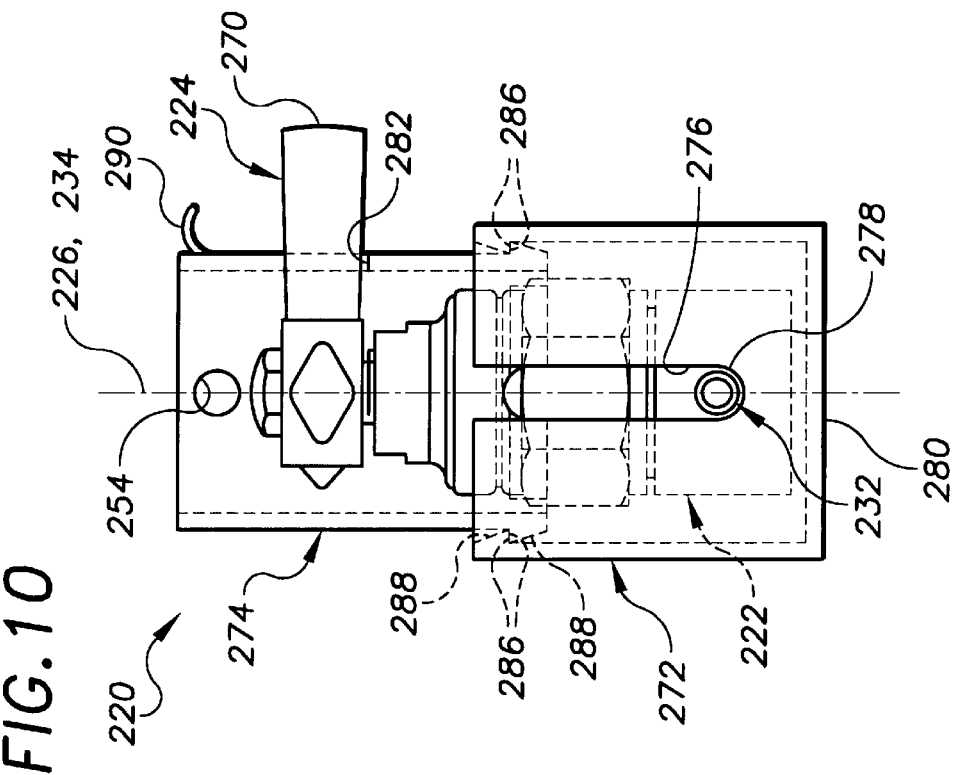
FIG. 10 is a side elevational view of a third embodiment of a lockout device according to the present invention shown in its locked configuration and engaging a valve.
Figure 12:
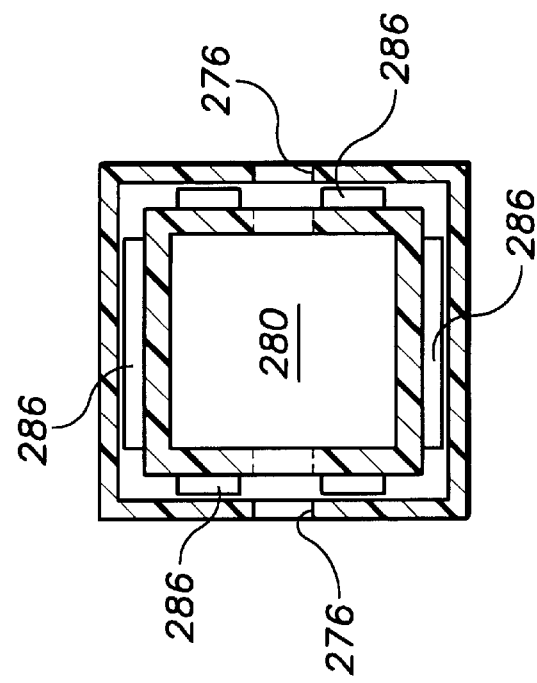
FIG. 12 is a cross-sectional view of the lockout device as taken along line 12—12 of FIG. 11.
Figure 11:
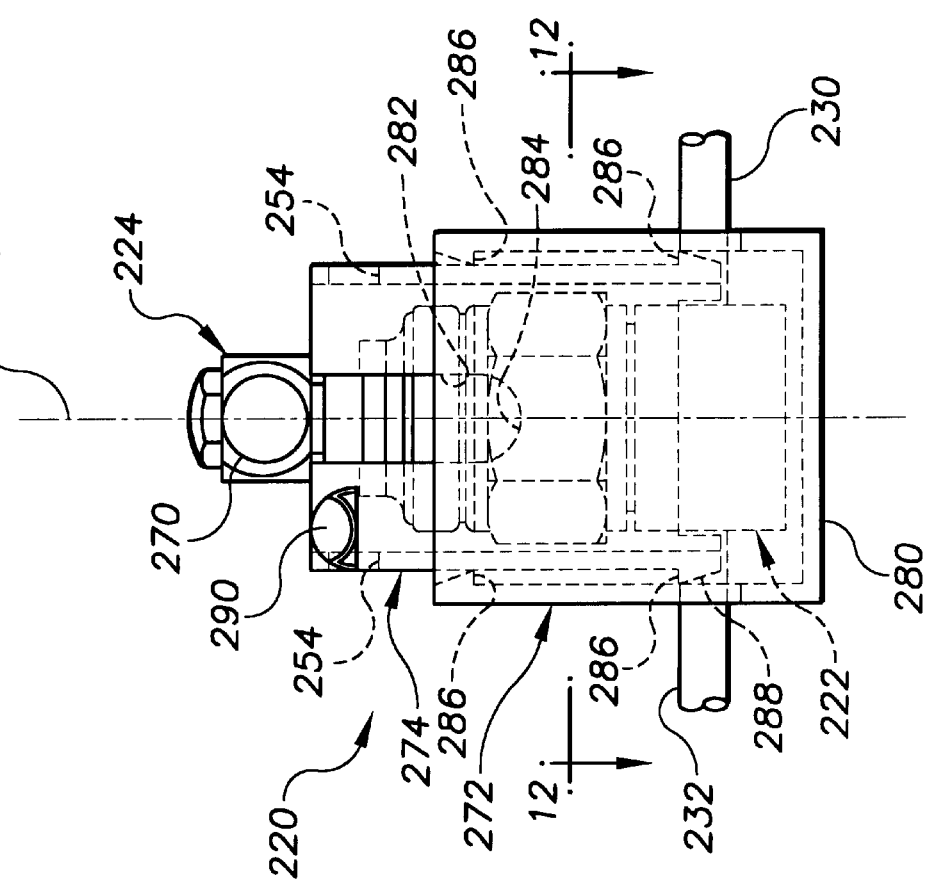
FIG. 11 is a front elevational view of the lockout device of FIG. 10 shown in its unlocked configuration and engaging a valve.

Referring now to FIGS. 10–12, there is shown a third embodiment of a lockout device 220 according to the present invention. Lockout device 220 is particularly suited for valve 222 that includes a handle 224 having at least one member 90 projecting radially outward from valve stem axis 226, such as the lever-type handle shown. Valve 222 is typically, but not necessarily, a "quarter-turn" valve that is fully open when handle 224 is parallel to the longitudinal axes of inlet and outlet pipes 230, 232 and is fully closed when the handle is perpendicular to the longitudinal axes of the inlet and outlet pipes, as shown in FIGS. 10 and 11. An example of valve 222 is Model No. 6LV-DLBW4, available from Nupro Company, Willoughby, Ohio. Lockout device 220 is also suited for being permanently mounted to valve 222 to eliminate the need to store the lockout device in a location remote from the valve when the lockout device is not being used. However, lockout device 220 need not be permanently attached or otherwise secured to valve 222.

Lockout device 220 includes a base 272 and a locking member 274 slidably engaging the base along longitudinal axis 234. In a preferred embodiment, base 272 and locking member 274 are preferably made of plastic, such as polycarbonate, polyvinyl chloride or polypropylene, among others, and are preferably made of the same material as one another. However, in alternative embodiments, base 272 and locking member 274 may be made of other materials, such as metal, resin-fiber composites or combinations of such materials, among others. In addition, base 272 and locking member 274 are each preferably molded as a unitary member, but may be made of two or more parts subsequently attached to one another, e.g., by adhesive bonding, welding, mechanical fasteners or various combinations thereof.

Base 272 and locking member 274 preferably have mating non-circular cross-sectional shapes perpendicular to longitudinal axis 234, such as the rectangular cross-sectional shape shown particularly in FIG. 12, to prevent the locking member from being rotated relative to the base about longitudinal axis 234. However, even a circular cross-sectional shape may be used as long as some anti-rotational means, such as a key and keyway (not shown), is provided to prevent such relative rotation. Base 272 may include open-ended vertical slots 276 for receiving inlet and outlet pipes 230, 232 during installation and when the base is fully engaged with valve 222. Slots 276 preferably have a width substantially equal to the diameter of the corresponding inlet pipe 230 or outlet pipe 232 so that there is little or no rotational play between base 272 and valve 222 in a plane perpendicular to valve stem axis 226. In addition, each slot 276 preferably has a radiussed end 278 having a radius substantially equal to the radius of the corresponding inlet pipe 230 or outlet pipe 232 to snugly receive same. Base 272 may also includes an end wall 280, which may be provided to increase the torsional rigidity of the base.

In a preferred embodiment, each slot 276 is open at top to allow base 272 to be installed from the bottom of valve 222. In alternative embodiments, slot 276 may be open at the bottom of base 272 to allow the base to be installed from the top of valve 222. In this case, end wall 280 would be eliminated or made detachable. In other alternative embodiments, slots 276 may be replaced with holes (not shown) such that base 272 must be positioned properly with respect to valve prior to attaching inlet and outlet pipes 230, 232 to valve 222. Base 272 may optionally be secured to valve 222, e.g., with mechanical fasteners (not shown) or other means. When holes are provided in lieu of slots 276, inlet and outlet pipes 230, 232 may be sufficient to secure base 272 to valve 222.

Locking member 274 includes an open-ended slot 282 for receiving handle 224 of valve 222 while the locking member is engaged with the handle and when the locking member is in its proper fully-extended position relative to base 272. Slot 282 preferably has a width substantially equal to the diameter of handle 224 at the location of the slot so that there is little or no rotational play between the handle and locking member 274 in a plane perpendicular to valve stem axis 226. Accordingly, handle 224 interferes with the proper extension of locking member 274 unless the handle is in its fully-closed position. In addition, slot 282 preferably has a radiussed end 284 having a radius substantially equal to the radius of handle 224 at the location of the slot to snugly receive same. If lockout device 220 is used with valve 222 that includes a handle 224 having more than one outwardly projecting member, locking member 274 may include more than one slot 282.

Base 272 and locking member 274 preferably include catches 286 or other stop means that engage one another to prevent the locking member from disengaging the base beyond its fully extended position. For example on the embodiment shown, catches 286 are preferably sized to provide an interference fit and may be located, as shown, on the inner perimeter of the upper end of base 272 and the outer perimeter of the lower end of locking member 274. Catches 286 may be provided on at least one pair of opposing walls of base 272 and the corresponding opposing walls of locking member 274 or may be provided on three or all four of the walls of each part. Preferable, each catch 286 includes a beveled surface 288 for engaging the corresponding beveled surface on the catch of the other part to aid with initially engaging locking member 274 with base 272. In addition, it is preferable that each catch 286 does not extend the entire length of the corresponding wall. This provides corresponding wall with greater flexibility to reduce the force required to overcome the interferences of catches 286 when initially engaging locking member 274 with base 272. One skilled in the art will appreciate that there are many stop means that may be provided to base 272, locking member or both to prevent the locking member from disengaging the base.

Locking member 274 may include a stop receiving means, such as apertures 254 for receiving a stop (not shown), such as shackles 58, 158 of padlocks 60, 160 shown in FIGS. 3 and 8, respectively. When the stop is inserted through apertures 254, it prevents locking member 274 from being retracted into base 272. In addition, if base 272 is not secured to valve 222, the stop also maintains base 272 in proper engagement with that valve that, in the embodiment shown, keeps slots 276 engaged with inlet and outlet pipes 230, 232. In alternative embodiments, stop receiving means may be located elsewhere on lockout device 220. For example, if base 272 is secured to valve 222, stop receiving means may include one or more apertures (not shown) in the base located adjacent lower end 294 of locking member 274 when the locking member is in its extended position so that a stop engages the lower end of the locking member to keep it in its extended position. Locking member 274 may optionally include a grip 290 for assisting a user (not shown) in moving the locking member between its disengaged position, where a substantial portion of the locking member is retracted into base, and its engaged position, shown in FIGS. 10 and 11.

While the present invention has been described in connection with several preferred embodiments, it will be understood that it is not so limited. On the contrary, it is intended to cover all alternatives, modifications and equivalents as may be included within the spirit and scope of the invention as defined in the appended claims.

What is claimed is:

1. A lockout device for a valve that includes a body and a handle having a surface and raised indicia located on, and extending away from, the surface, comprising:
   a. a member having a sidewall and an end wall, said sidewall and said end wall defining a space for receiving at least a portion of the handle and at least a portion of the body; and
   b. means for receiving the raised indicia, and not the handle, only when the handle is oriented properly with respect to the lockout device when the device is engaged with the valve, said means being located on said member.

2. A lockout device according to claim 1, wherein said end wall has an inner surface and said means for receiving only the raised indicia comprises a channel located at said inner surface.

3. A lockout device according to claim 1, wherein the handle has a thickness at a location other than at the raised indicia, said sidewall further including at least one aperture spaced from said inner surface of said end wall by a distance substantially equal to the thickness of the handle.

4. A lockout device according to claim 1, wherein the lockout device may be locked to the valve using a stop, said sidewall further comprises at least one aperture for receiving the stop and located such that when the lockout device is fully engaged with the valve except for the indicia being received in the means for receiving only the raised indicia, a portion of the valve prevents the stop from being properly engaged with said aperture.

5. A lockout device according to claim 4, wherein said sidewall includes two apertures for receiving the stop simultaneously therethrough only when the lockout device is fully seated on the valve.

6. A lockout device according to claim 1, wherein the valve body has at least one edge parallel to said longitudinal axis when the lockout device is properly seated on the valve and said sidewall has an inner surface, the lockout device further comprising at least one groove parallel to said longitudinal axis for receiving the edge of the valve body when the lockout device is properly seated on the valve.

7. A lockout device according to claim 1, wherein a pipe is attached to the valve body and said sidewall further includes at least one notch for receiving the pipe when the lockout device is properly seated on the valve.

8. A lockout device for a valve having a handle and a valve body and capable of being secured to the valve with a stop, comprising:
   a. a member defining a space for receiving at least a portion of the valve and a first means for receiving the stop; and
   b. second means for causing a portion of the valve to block the complete engagement of the stop with said first means by interference between the stop and the valve handle only when the handle of the valve is not properly oriented with respect to the lockout device.

9. A lockout device according to claim 8, wherein the handle has a first surface located opposite the valve body and includes raised indicia, said member including an end wall having a second surface located immediately adjacent the first surface of the handle when the lockout device is oriented properly on the valve, said second means including a recess in said second surface configured for receiving the raised indicia, and not the handle, when the lockout device is properly oriented with respect to the lockout device.

10. A lockout device according to claim 9, wherein said recess is a channel.

11. A lockout device according to claim 9, wherein the handle has a thickness at a location other than at the indicia that extends in a direction perpendicular to the first surface, said first means for receiving the stop including at least one aperture in said sidewall spaced from said second surface by a distance of about the thickness of the handle.

12. A lockout device according to claim 8, wherein the valve body has at least one edge parallel to said longitudinal axis when the lockout device is properly seated on the valve and said sidewall has an inner surface, the lockout device further comprising at least one groove parallel to said longitudinal axis for receiving the edge of the valve body when the lockout device is properly seated on the valve.

13. A lockout device according to claim 8, wherein a pipe is attached to the valve body and said sidewall further includes at least one notch for receiving the pipe when the lockout device is properly seated on the valve.

14. A lockout device for a valve having a handle and a valve body and capable of being secured to the valve with a stop, the handle having a first surface opposite the valve body, raised indicia on, and extending away from, the first surface and a thickness extending in a direction perpendicular to the first surface at a location other than at the raised indicia, said handle having a fully-closed position, comprising:

a. a sidewall having a longitudinal axis and an end;
  b. an end wall attached to said sidewall at said end and having a second surface located immediately adjacent the first surface of the handle when the lockout device is properly seated on the valve;
  c. a recess in said second surface of said end wall for receiving the raised indicia, but not the entire handle, when the handle is in a fully closed position; and
  d. a first aperture and a second aperture each located in said sidewall and located a distance from said second surface of said end wall equal to about the thickness of the handle, said first and second apertures for simultaneously receiving the stop when the lockout device is in a fully seated position.

15. A valve assembly, comprising:

a. a valve including a body and a handle attached to said body, said handle having a surface and raised indicia located on, and extending away from, said surface;
  b. a member having a sidewall and an end wall, said sidewall and said end wall defining a space containing at least a portion of said handle and at least a portion of said body; and
  c. means for receiving said raised indicia, and not said handle, only when said handle is oriented properly with respect to said member, said means being located on said member.

16. A valve assembly according to claim 15, further comprising a stop, said member having at least one opening for receiving said stop therethrough such that said handle interferes with said stop during an attempt to remove said member from said valve.

* * * * *